US009070318B2

(12) United States Patent
Hwang et al.

(10) Patent No.: US 9,070,318 B2
(45) Date of Patent: Jun. 30, 2015

(54) DISPLAY APPARATUS AND A METHOD OF DRIVING THE SAME

(71) Applicant: SAMSUNG DISPLAY CO., LTD., Gyeonggi-Do (KR)

(72) Inventors: Jun-Ho Hwang, Chungcheongnam-do (KR); Jang-Hoon Kwak, Chungcheongnam-do (KR); Seung-Woon Shin, Chungcheongnam-do (KR); Yong-jin Shin, Chungcheongnam-do (KR); Jang-Mi Lee, Busan (KR); Kihyun Pyun, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 155 days.

(21) Appl. No.: 13/756,945

(22) Filed: Feb. 1, 2013

(65) Prior Publication Data

US 2014/0085354 A1 Mar. 27, 2014

(30) Foreign Application Priority Data

Sep. 21, 2012 (KR) ........................ 10-2012-0105394

(51) Int. Cl.

| | |
|---|---|
| ***G09G 5/10*** | (2006.01) |
| ***G06F 3/041*** | (2006.01) |
| ***G09G 5/12*** | (2006.01) |
| ***G09G 3/34*** | (2006.01) |

(52) U.S. Cl.

CPC .................. *G09G 5/12* (2013.01); *G09G 3/342* (2013.01); *G09G 2310/0281* (2013.01); *G09G 2310/067* (2013.01); *G09G 2320/0233* (2013.01)

(58) Field of Classification Search

USPC .................................................... 455/89, 690

See application file for complete search history.

(56) References Cited

U.S. PATENT DOCUMENTS

| | | | | |
|---|---|---|---|---|
| 6,549,187 | B1 | 4/2003 | Matsubara et al. | |
| 2002/0084971 | A1 | 7/2002 | Youn | |
| 2008/0231620 | A1 | 9/2008 | Hector et al. | |
| 2008/0266227 | A1* | 10/2008 | Arasawa et al. | 345/89 |
| 2012/0026207 | A1* | 2/2012 | Komiya et al. | 345/690 |

FOREIGN PATENT DOCUMENTS

| | | |
|---|---|---|
| KR | 1020010053694 | 7/2001 |
| KR | 1020030025568 | 3/2003 |
| KR | 1020030034869 | 5/2003 |
| KR | 1020040103038 | 12/2004 |
| KR | 1020060005161 | 1/2006 |
| KR | 1020070044596 | 4/2007 |

* cited by examiner

*Primary Examiner* — Michael Faragalla

(74) *Attorney, Agent, or Firm* — F. Chau & Associates, LLC

(57) ABSTRACT

A display device includes a display panel, a timing controller, a data driver, a gate driver and a backlight unit. The gate driver sequentially outputs gate signals to gate lines. The backlight unit performs an on-operation during a high section of a backlight control signal and an off-operation during a low section of the backlight control signal. The gate signals includes first gate signals that are output during the high section of the backlight control signal and have a first pulse width and second gate signals that are output during the low section of the backlight control signal and have a second pulse width greater than the first pulse width.

20 Claims, 7 Drawing Sheets

DISPLAY APPARATUS AND A METHOD OF DRIVING THE SAME

CROSS-REFERENCE TO RELATED APPLICATION

This U.S. non-provisional patent application claims priority under 35 U.S.C. §119 to Korean Patent Application No. 10-2012-0105394, filed on Sep. 21, 2012, the disclosure of which is incorporated by reference herein in its entirety.

TECHNICAL FIELD

The present inventive concept relates to display apparatuses and methods of driving the same, and more particularly, to a display apparatus having reduced water-fall noise and a method of driving the same.

DISCUSSION OF THE RELATED ART

A display apparatus can be classified as an active display apparatus or a passive display apparatus according to whether it requires a light source. The passive display apparatus needs a backlight unit to provide light and may be, for example, a liquid crystal display (LCD) device.

An LCD device may include a thin film transistor substrate, an opposite substrate facing the thin film transistor substrate and a liquid crystal layer disposed between the thin film transistor substrate and the opposite substrate.

To lower the cost of producing a display device, a four mask process that forms a thin film transistor substrate by performing a photolithography process four times has been developed.

A thin film transistor substrate formed by the four mask process may include a semiconductor pattern and a data pattern formed on the semiconductor pattern. The data pattern may be smaller than the semiconductor pattern due to anisotropy of a wet etching process and an etch-back process. Thus, the semiconductor pattern may have a protrusive portion that does not overlap the data pattern. The semiconductor pattern may be mainly amorphous silicon.

Since conductivity of amorphous silicon varies depending on the amount of entering light, an electrostatic capacity of a capacitor having the data pattern as an electrode varies according to whether the protrusive portion of the semiconductor pattern receives light from a backlight unit. However, this may cause a screen to be partly bright or dark.

In particular, in the case that a drive frequency of a backlight unit is not in synchronization with a drive frequency of a display panel, water-fall noise, which appears as a bright band and a dark band flowing up and down the screen, may occur.

FIG. 1 illustrates waterfall noise that may occur in a conventional LCD device 10. Referring to FIG. 1, a dark image AA1 and a bright image AA2 in the LCD device 10 are shown as horizontal lines. Here, the dark image AA1 is displayed during an off section of a backlight unit and the bright image AA2 is displayed during an on section of the backlight unit.

SUMMARY

An exemplary embodiment of the inventive concept provides a method of driving a display device, the method including: outputting, from a timing controller, a gate control signal, an image signal, a backlight control signal and a data control signal, wherein the gate control signal includes a gate clock; outputting, from a data driver, a data voltage, which corresponds to the image signal, to data lines of a display panel according to the data control signal; outputting, from a gate driver, gate signals in synchronization with the gate clock to gate lines of the display panel; performing an on-operation of a backlight unit during a high section of the backlight control signal; and performing an off-operation of the backlight unit during a low section of the backlight control signal, wherein the gate signals are output with a first pulse width during the high section of the backlight control signal and a second pulse width greater than the first pulse width during the low section of the backlight control signal.

The gate clock is output with the first pulse width during the high section of the backlight control signal and the second pulse width during the low section of the backlight control signal.

Outputting the gate control signal, the image signal, the backlight control signal and the data control signal comprises: generating a base clock and a gate enable signal; and generating the gate clock on the basis of the base clock and the gate enable signal.

The gate clock has a low section according to a high section of the gate enable signal.

Outputting the gate signals in synchronization with the gate clock to the gate lines comprises: applying a gate signal having the first pulse width to a first pixel of the display panel; and applying a gate signal having the second pulse width to a second pixel of the display panel, wherein a charge rate of a data voltage applied to the second pixel is greater than a charge rate of a data voltage applied to the first pixel.

A brightness of an image displayed in the first pixel is the same as a brightness of an image displayed in the second pixel.

A drive frequency of the backlight unit is greater than a drive frequency of the display panel.

An exemplary embodiment of the inventive concept provides a method of driving a display device, the method including: outputting, from a timing controller, a first gate control signal, a second gate control signal, an image signal, a backlight control signal and a data control signal, wherein the first gate control signal includes a first gate clock and the second gate control signal includes a second gate clock; outputting, from a data driver, a data voltage, which corresponds to the image signal, to data lines of a display panel according to the data control signal; outputting, from a first gate driver, first gate signals in synchronization with the first gate clock to odd numbered gate lines of the display panel; outputting, from a second gate driver, second gate signals in synchronization with the second gate clock to even numbered gate lines of the display panel; performing an on-operation of a backlight unit during a high section of the backlight control signal; and performing an off-operation of the backlight unit during a low section of the backlight control signal, wherein the first gate signals and the second gate signals are output with a first pulse width during the high section of the backlight control signal and a second pulse width greater than the first pulse width during the low section of the backlight control signal.

Each of the first gate clock and the second gate clock have the first pulse width during the high section of the backlight control signal and the second pulse width during the low section of the backlight control signal.

Outputting the first gate signals in synchronization with the first gate clock to the odd numbered gate lines and outputting the second gate signals in synchronization with the second gate clock to the even numbered gate lines comprise: applying a gate signal having the first pulse width to a first pixel of the display panel; and applying a gate signal having the second pulse width to a second pixel of the display panel, wherein a charge rate of a data voltage applied to the second pixel is greater than a charge rate of a data voltage applied to the first pixel.

A brightness of an image displayed in the first pixel is the same as a brightness of an image displayed in the second pixel.

An exemplary embodiment of the inventive concept provides a display device. The display device may include a display panel including gate lines, data lines crossing the gate lines and a plurality of pixels, wherein the display panel is configured to display an image; a timing controller configured to output a gate control signal, an image signal, a backlight control signal and a data signal, wherein the gate control signal includes a gate clock; a data driver configured to output a data voltage, which corresponds to the image signal, to the data lines according to the data control signal; a gate driver configured to sequentially output gate signals in synchronization with the gate clock to the gate lines; and a backlight unit configured to perform an on-operation during a high section of the backlight control signal and an off-operation during a low section of the backlight control signal. The gate signals comprise first gate signals that are output during the high section of the backlight control signal and have a first pulse width and second gate signals that are output during the low section of the backlight control signal and have a second pulse width.

The gate clock has the first pulse width during the high section of the backlight control signal and the second pulse width during the low section of the backlight control signal.

The timing controller comprises: a signal generating part configured to generate a base clock and a gate enable signal; and a gate clock generating part configured to generate the gate clock on the basis of the base clock and the gate enable signal.

The gate clock has a low section according to a high section of the gate enable signal.

The plurality of pixels comprise: a first pixel connected to a gate line to which the first gate signals are applied; and a second pixel connected to a gate line to which the second gate signals are applied, wherein a charge rate of a data voltage applied to the second pixel is greater than a charge rate of a data voltage applied to the first pixel.

A drive frequency of the backlight unit is a greater than a drive frequency of the display panel.

An exemplary embodiment of the inventive concept provides a display device comprising: a display panel including gate lines, data lines crossing the gate lines and a plurality of pixels, wherein the display panel is configured to display an image; a timing controller configured to output a first gate control signal, a second gate control signal, an image signal, a backlight control signal and a data signal, wherein the first gate control signal includes a first gate clock and the second gate control signal includes a second gate clock; a data driver configured to output a data voltage, which corresponds to the image signal, to the data lines according to the data control signal; a first gate driver configured to sequentially output first gate signals in synchronization with the first gate clock to odd numbered gate lines among the gate lines; a second gate driver configured to sequentially output second gate signals in synchronization with the second gate clock to even numbered gate lines among the gate lines; and a backlight unit configured to perform an on-operation during a high section of the backlight control signal and an off-operation during a low section of the backlight control signal, wherein the first gate signals comprise: third gate signals that are output during the high section of the backlight control signal and have a first pulse width; and fourth gate signals that are output during the low section of the backlight control signal and have a second pulse width, wherein the second gate signals comprise: fifth gate signals that are output during the high section of the backlight control signal and have the first pulse width; and sixth gate signals that are output during the low section of the backlight control signal and have the second pulse width.

Each of the first gate clock and the second gate clock has the first pulse width during the high section of the backlight control signal and the second pulse width during the low section of the backlight control signal.

The plurality of pixels comprise: a first pixel connected to a gate line to which the third and fifth gate signals are applied; and a second pixel connected to a gate line to which the fourth and sixth gate signals are applied, wherein a charge rate of a data voltage applied to the second pixel is greater than a charge rate of a data voltage applied to the first pixel.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF EXEMPLARY EMBODIMENTS

Exemplary embodiments of the inventive concept will be described more fully hereinafter with reference to the accompanying drawings. This inventive concept may, however, be embodied in many different forms and should not be construed as limited to the embodiments set forth herein. Like numbers may refer to like elements throughout the specification and drawings.

Figure 1:
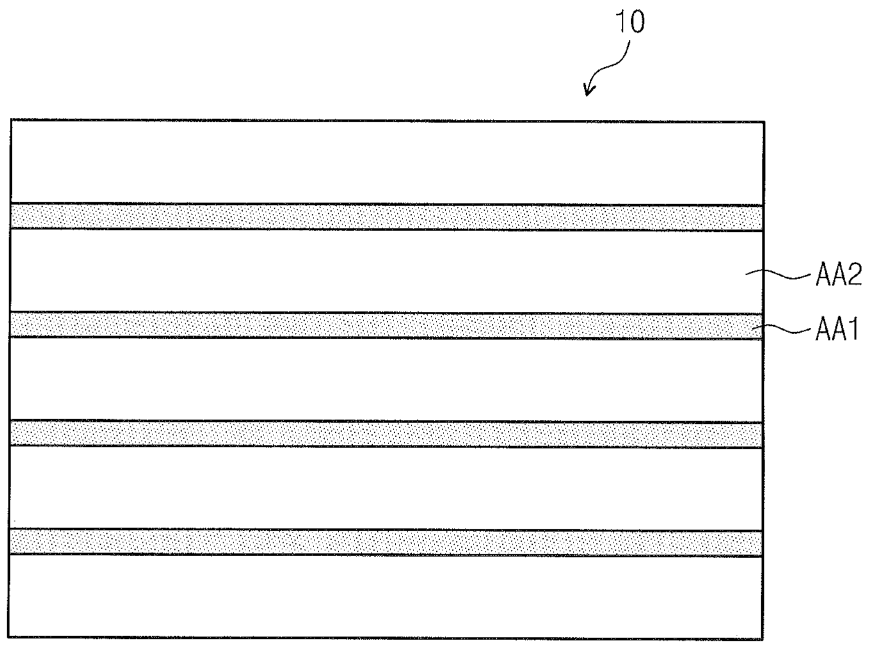
FIG. 1 illustrates waterfall noise that may occur in a conventional liquid crystal display device.
Figure 2:
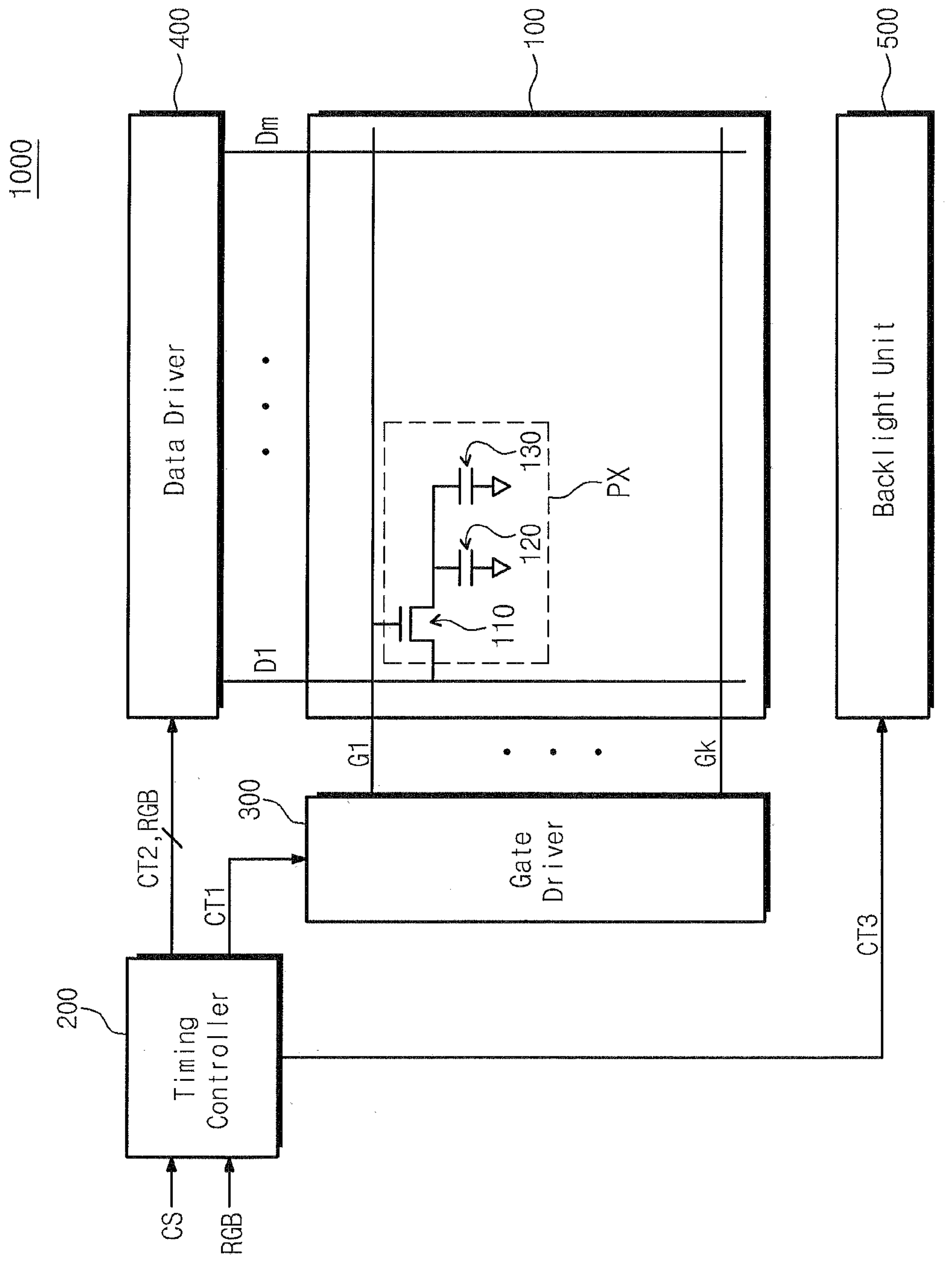
FIG. 2 is a block diagram of a display device in accordance with an exemplary embodiment of the inventive concept.

FIG. 2 is a block diagram of a display device in accordance with an exemplary embodiment of the inventive concept.

Referring to FIG. 2, the display device 1000 may include a display panel 100, a timing controller 200, a gate driver 300, a data driver 400 and a backlight unit 500.

The display panel 100 displays an image. The display panel 100 may be a passive type display panel that needs a separate light source. A liquid crystal display panel, an electrophoretic display panel, and an electrowetting display panel may be used as the display panel 100.

In the present embodiment, a liquid crystal display panel including a liquid crystal display layer disposed between two substrates is described as an illustrative example. Although not illustrated in the drawings, a display device including the liquid crystal display panel may further include a pair of polarizing plates disposed across the liquid crystal display panel.

The display panel 100 includes a plurality of gate lines G1-Gk for receiving a gate signal and a plurality of data lines D1-Dm for receiving a data voltage. The gate lines G1-Gk and the data lines D1-Dm cross each other while being insulating from each other. A number of pixel areas arranged in a matrix form are defined in the display panel 100. Each of the pixel areas include a number of pixels. The number of pixel areas may be large and the number of pixels in a pixel area may be large. An equivalent circuit of one pixel PX of the pixels is shown in FIG. 2 as an illustrative example. The pixel PX includes a thin film transistor 110, a liquid crystal capacitor 120 and a storage capacitor 130.

The thin film transistor 110 includes a gate electrode, a source electrode and a drain electrode. The gate electrode is connected to a first gate line G1 of the gate lines G1-Gk. The source electrode is connected to a first data line D1 of the data lines D1-Dm. The drain electrode is connected to the liquid crystal capacitor 120 and the storage capacitor 130. The liquid crystal capacitor 120 and the storage capacitor 130 are connected to the drain electrode in parallel.

The display panel 100 may include a first display substrate, a second display substrate facing the first display substrate and a liquid crystal layer disposed between the first and second display substrates.

On the first display substrate, the gate lines G1-Gk, the data lines D1-Dm, the thin film transistor 110 and a first electrode (not shown) of the liquid crystal capacitor 120 are formed. The thin film transistor 110 applies the data voltage to the first electrode in response to the gate signal.

On the second display substrate, a second electrode (not shown) of the liquid crystal capacitor 120 is formed and a reference voltage is applied to the second electrode. The liquid crystal layer performs a dielectric role between the first and second electrodes. A voltage corresponding to a potential difference between the data voltage and the reference voltage is charged in the liquid crystal capacitor 120.

The timing controller 200 receives an image signal RGB (red, green, blue) and a control signal CS from an external graphic controller (not shown). The image signal may correspond to other color schemes, e.g., CMYK (cyan, magenta, yellow and black).

The timing controller 200 receives the control signal CS, for example, a vertical synchronizing signal, a horizontal synchronizing signal, a main clock, a data enable signal, etc. to output a first control signal CT1, a second control signal CT2 and a third control signal CT3.

The first control signal CT1 is a gate control signal for controlling an operation of the gate driver 300. The first control signal CT1 may include a gate clock CPV and a vertical start signal STV. The timing controller 200 generates a base clock CLK and a gate enable signal OE from the control signal CS and generates the gate clock CPV on the basis of the gate enable signal OE.

The second control signal CT2 is a data control signal for controlling an operation of the data driver 400. The second control signal CT2 includes a horizontal start signal for starting an operation of the data driver 400, a reverse signal for reversing a polarity of a data voltage and an output direction signal for determining a time that the data voltage is output from the data driver 400.

The third control signal CT3 is a signal for controlling an operation of the backlight unit 500. The third control signal CT3 includes a backlight control signal BLU for determining an on section and an off section of the backlight unit 500. In other words, an on-time and an off-time of the backlight unit 500.

The gate driver 300 is electrically connected to the gate lines G1-Gk formed on the display panel 100 to provide a gate signal to the gate lines G1-Gk. The gate driver 300 generates the gate signal for driving the gate lines G1-Gk on the basis of the first control signal CT1 and sequentially outputs the generated gate signal to the gate lines G1-Gk. The gate signal may include a normal gate signal and a modulation gate signal having different pulse widths from each other.

The data driver 400 outputs a data voltage that corresponds to the image signal RGB on the basis of the second control signal CT2 to the data lines D1-Dm.

The backlight unit 500 is disposed under the display panel 100 to provide light to the display panel 100.

The backlight unit 500 performs a blinking operation on the basis of the third control signal CT3 and repeats an on-operation and an off-operation on a regular basis. The backlight unit 500 can perform one on-operation and one off-operation during one period, for example. However, the backlight unit 500 can perform more than one on-operation and more than one off-operation per period.

A drive frequency of the backlight unit 500 may be an integer multiple of a drive frequency of the display panel 100, or simply greater than the drive frequency of the display panel 100.

Figure 3:
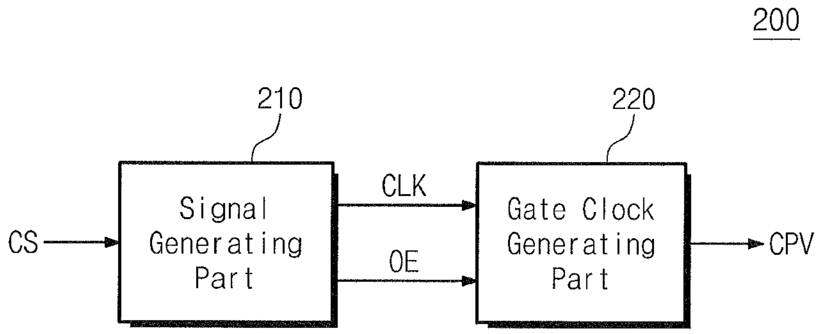
FIG. 3 is a block diagram illustrating a part of a timing controller of FIG. 2, according to an exemplary embodiment of the inventive concept.

FIG. 3 is a block diagram illustrating a part of the timing controller of FIG. 2, according to an exemplary embodiment of the inventive concept. In FIG. 3, only parts used to generate the gate clock CPV from the timing controller 200 are illustrated.

Referring to FIG. 3, the timing controller 200 includes a signal generating part 210 and a gate clock generating part 220.

The signal generating part 210 generates the base clock CLK and the gate enable signal OE in response to the control signal CS. The base clock CLK is a signal that repeats a high section and a low section while having a specific width. The gate enable signal OE is a signal for determining a low section of the gate clock CPV.

The gate clock generating part 220 receives the base clock CLK and the gate enable signal OE and generates the gate clock CPV on the basis of the base clock CLK and the gate enable signal OE. A rising edge of the gate clock CPV is generated in synchronization with a rising edge of the base clock CLK and a falling edge of the gate clock CPV is generated in synchronization with a rising edge of the gate enable signal OE. The gate clock CPV can determine a high section of the gate signals.

Figure 4:
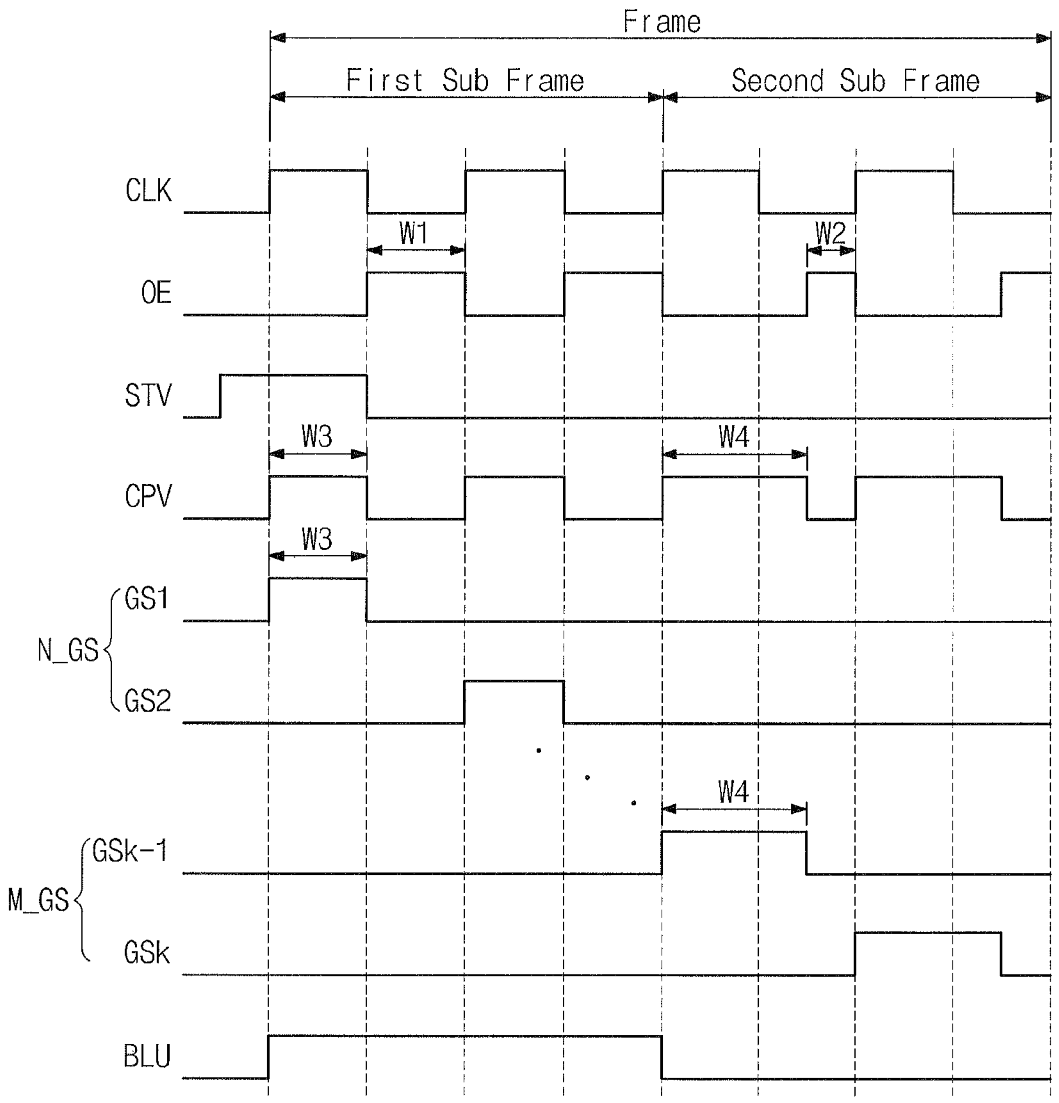
FIG. 4 is a timing diagram illustrating a vertical start signal, a base clock, a gate enable signal, a gate clock, gate signals and a backlight control signal of during one frame in the display device of FIG. 2, according to an exemplary embodiment of the inventive concept.

FIG. 4 is a timing diagram illustrating a vertical start signal STV, a base clock CLK, a gate enable signal OE, a gate clock CPV, gate signals GS1-GSk and a backlight control signal BLU during one frame in the display device 1000 of FIG. 2, according to an exemplary embodiment of the inventive concept. In the following discussion of the FIG. 4 timing diagram, a high section may correspond to a logic one or a high voltage and a low section may correspond to a logic zero or a low voltage, for example.

Referring to FIGS. 2 and 4, as an illustration, the backlight unit 500 has the same drive frequency as the display panel 100. While the display panel 100 drives the gate lines G1-Gk, the backlight unit 500 can perform one on-operation and one off-operation. In FIG. 4, during a first sub frame (e.g., the first part of the one frame) in which the backlight control signal BLU has a high section, the backlight unit 500 performs an on-operation and during a second sub frame (e.g., the second part of the one frame) in which the backlight control signal BLU has a low section, the backlight unit 500 performs an off-operation.

In FIG. 4, the backlight control signal BLU is illustrated to have a 50% duty rate but the duty rate is not limited thereto. The duty rate can be freely set.

The gate clock CPV can be determined by the base clock CLK and the gate enable signal OE.

The gate enable signal OE may have a first pulse width W1 during the first sub frame and may have a second pulse width W2 during the second sub frame. The second pulse width W2 may be smaller than the first pulse width W1.

Since a low section of the gate clock CPV is determined by a high section of the gate enable signal OE, the gate clock CPV may have a third pulse width W3 during the first sub frame and may have a fourth pulse width W4 during the second sub frame. The third pulse width W3 may be smaller than the fourth pulse width W4.

If the vertical start signal STV is input to the gate driver 300, the gate driver 300 generates gate signals GS1-GSk having a high section during a high section of the gate clock CPV to sequentially output those gate signal GS1-GSk to the gate lines G1-Gk. The gate signals GS1-GSk may include normal gate signals N_GS (GS1 and GS2) output during the first sub frame and modulation gate signal M_GS (GSK-1 and GSK) output during the second sub frame.

The normal gate signals N_GS have the third pulse width W3 and the modulation gate signals M_GS have the fourth pulse width W4.

A pixel connected to a gate line (e.g., one of G1-Gk) to which one of the normal gate signals N_GS is applied may be a first pixel PX1 and a pixel connected to a gate line (e.g., one of G1-Gk) to which one of the modulation gate signals M_GS is applied may be a second pixel PX2.

Figure 5A:
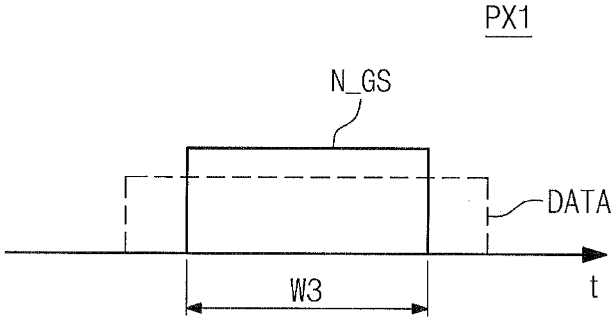
FIG. 5A is a diagram showing a charge rate of a first pixel and FIG. 5B is a diagram showing a charge rate of a second pixel, according to an exemplary embodiment of the inventive concept.
Figure 5B:
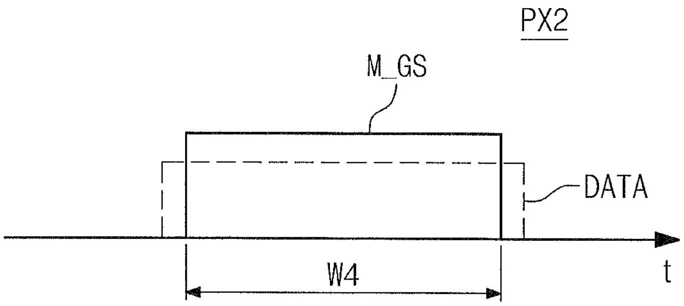

FIG. 5A is a diagram showing a charge rate of a first pixel PX1 and FIG. 5B is a diagram showing a charge rate of a second pixel PX2, according to an exemplary embodiment of the inventive concept. It is assumed that in this example data voltages applied to the first pixel PX1 and the second pixel PX2 are same.

Referring to FIGS. 5A and 5B, since the fourth pulse width W4 is set to be greater than the third pulse width W3, a charge rate of a data voltage applied to the second pixel PX2 may be greater than a charge rate of a data voltage applied to the first pixel PX1.

The third pulse width W3 and the fourth pulse width W4 may be set in consideration of a degree that the brightness of an image is decreased due waterfall noise.

Thus, by setting the charge rate of the data voltage of the second pixel PX2 to be greater than that of the first pixel PX1 during a section in which the backlight unit 500 is turned off, the brightness of an image displayed in the first pixel PX1 and the brightness of an image displayed in the second pixel PX2 can be maintained at or about the same level.

In the display device 1000 in accordance with an exemplary embodiment of the inventive concept, drive frequencies of the display panel 100 and the backlight unit 500 are the same; however, a drive frequency of the backlight unit 500 may be an integer multiple of more than two times that of a drive frequency of the display panel 100. If the drive frequency of the backlight unit 500 is two times higher than the drive frequency of the display panel 100, the backlight unit 500 can perform an on-operation and an off-operation twice during one frame. In this case, a pulse width of a gate signal (e.g., N_GS) during a low section of the backlight control signal BLU may be greater than a pulse width of a gate signal (e.g., M_GS) during a high section of the backlight control signal BLU.

Figure 6:
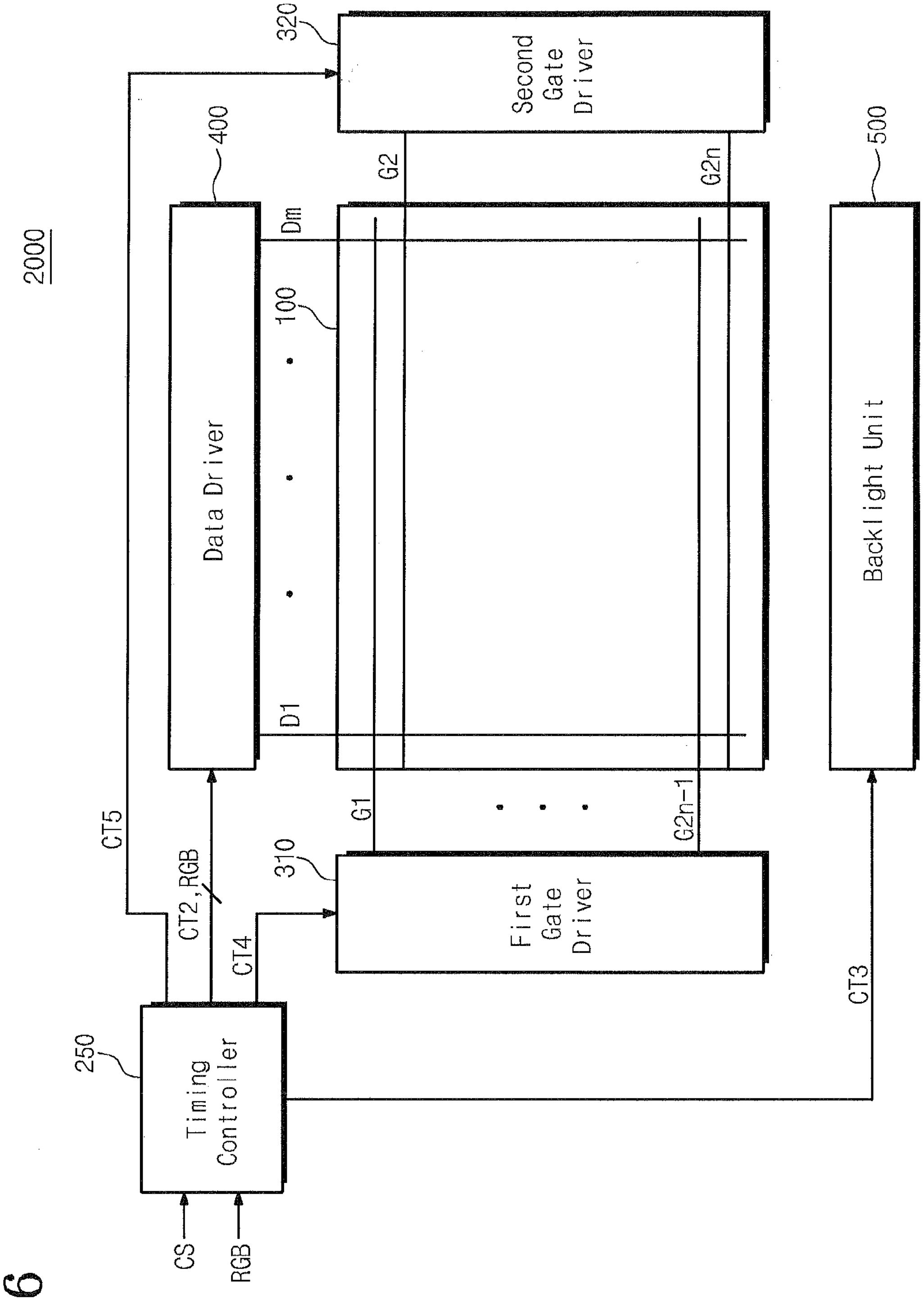
FIG. 6 is a block diagram of a display device in accordance with an exemplary embodiment of the inventive concept.

FIG. 6 is a block diagram of a display device 2000 in accordance with an exemplary embodiment of the inventive concept.

In comparison with the display device 1000 of FIG. 2 in accordance with an exemplary embodiment of the inventive concept, the display device 2000 of FIG. 6 in accordance with an exemplary embodiment of the inventive concept is different in that it includes two gate drivers. Accordingly, most overlapping description between the shared parts of the two display devices is omitted.

Referring to FIG. 6, the display device 2000 includes a first gate driver 310 and a second gate driver 320.

The first gate driver 310 is electrically connected to odd numbered gate lines G1-G2n−1 among gate lines G1-Gn to provide a first gate signal to the odd numbered gate lines G1-G2n−1. The second gate driver 320 is electrically connected to even numbered gate lines G2-G2n among the gate lines G1-Gn to provide a second gate signal to the even numbered gate lines G2-G2n. However, the first and second gate drivers 310 and 320 are not limited to this connection scheme. For example, the first and second gate drivers 310 and 320 can each be connected to pairs of gate lines in alternating fashion.

The first gate driver 310 and the second gate driver 320 can alternately drive the odd numbered gate lines G1-G2n−1 and the even numbered gate lines G2-G2n and can drive one odd numbered gate line and one even numbered gate line at the same time, for example.

A timing controller 250 receives a control signal CS and outputs a fourth control signal CT4 and a fifth control signal CT5 on the basis of the control signal CS. The fourth control signal CT4 is applied to the first gate driver 310 and the fifth control signal CT5 is applied to the second gate driver 320.

The fourth control signal CT4 is a first gate control signal for controlling an operation of the first gate driver 310. The fourth control signal CT4 may include a first gate clock CPV1 and a first vertical start signal STV1.

The fifth control signal CT5 is a second gate control signal for controlling an operation of the second gate driver 320. The fifth control signal CT5 may include a second gate clock CPV2 and a second vertical start signal STV2.

Figure 7:
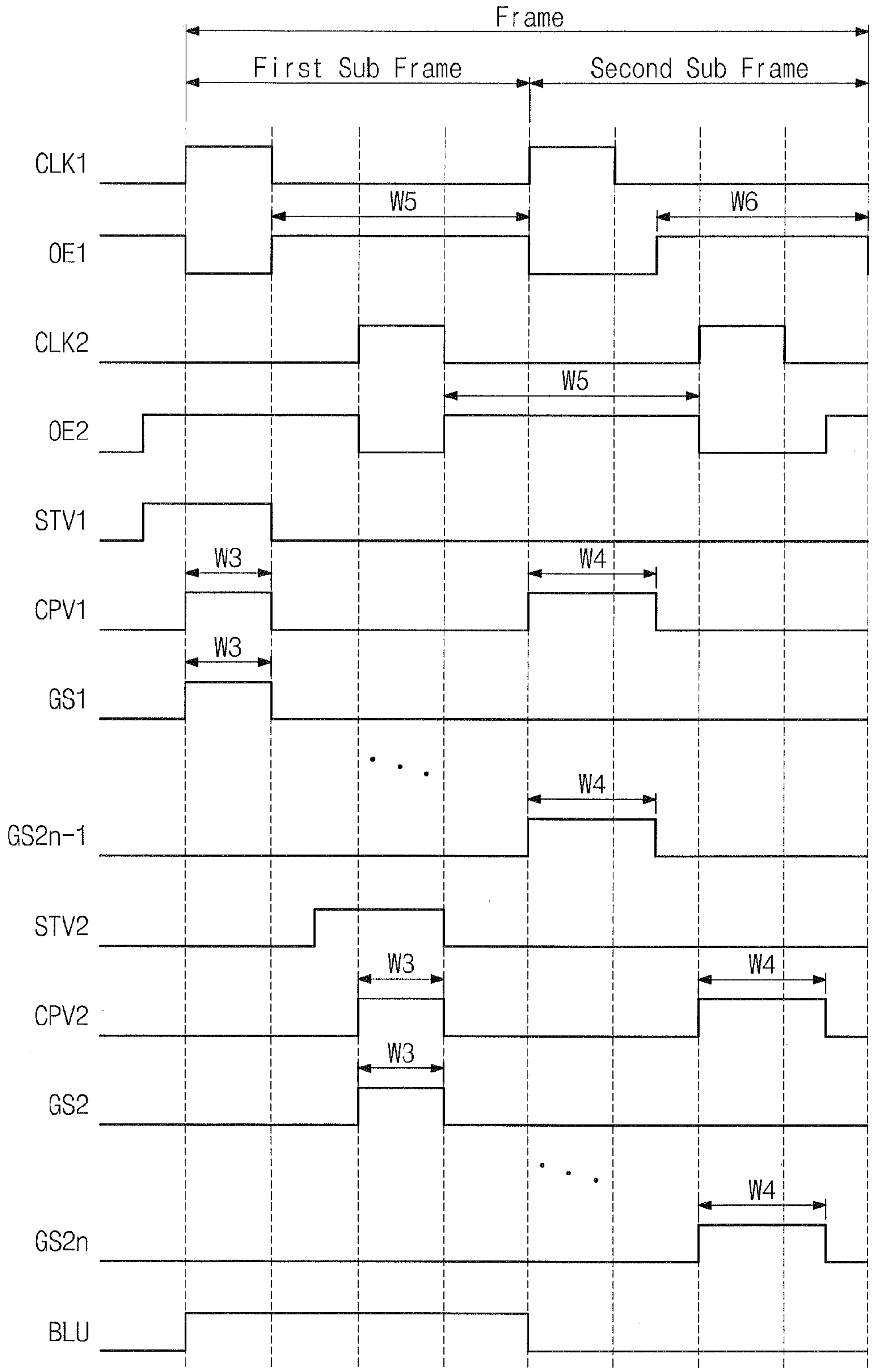
FIG. 7 is a timing diagram illustrating a first vertical start signal, a first base clock, a first gate enable signal, a first gate clock, first gate signals, a second vertical start signal, a second base clock, a second gate enable signal, a second gate clock, second gate signals and a backlight control signal during one frame in the display device of FIG. 6, according to an exemplary embodiment of the inventive concept.

FIG. 7 is a timing diagram illustrating a first vertical start signal STV1, a first base clock CLK1, a first gate enable signal OE1, a first gate clock CPV1, first gate signals GS1-GS2n−1, a second vertical start signal STV2, a second base clock CLK2, a second gate enable signal OE2, a second gate clock CPV2, second gate signals GS2-GS2n and a backlight control signal BLU during one frame in the display device 2000 of FIG. 6, according to an exemplary embodiment of the inventive concept.

Referring to FIGS. 6 and 7, the backlight unit 500 may perform an on-operation during a first sub frame (e.g., the first part of the one frame) in which the backlight control signal BLU has a high section and may perform an off-operation during a second sub frame (e.g., the second part of the one frame) in which the backlight control signal BLU has a low section. In the following discussion of the FIG. 7 timing diagram, a high section may correspond to a logic one or a high voltage and a low section may correspond to a logic zero or a low voltage, for example.

The timing controller 250 generates the first gate clock CPV1 on the basis of the first base clock CLK1 and the first gate enable signal OE1. The timing controller 250 generates the second gate clock CPV2 on the basis of the second base clock CLK2 and the second gate enable signal OE2.

The first gate enable signal OE1 may have a first pulse width W5 during the first sub frame and a second pulse width W6 during the second sub frame. The second pulse width W6 may be smaller than the first pulse width W5. The second gate enable signal OE2 corresponds to the first gate enable signal OE1 delayed by ¼ frame.

Low sections of the first gate clock CPV1 and the second gate clock CPV2 are determined by high sections of the first gate enable signal OE1 and the second gate enable signal OE2 respectively. Thus, the first gate clock CPV1 and the second gate clock CPV2 may have a third pulse width W3 during the first sub frame and a fourth pulse width W4 during the second sub frame. The third pulse width W3 may be smaller than the fourth pulse width W4.

If the first vertical start signal STV1 is input into the first gate driver 310, the first gate driver 310 generates first gate signals GS1-GS2*n*−1 having a high section during a high section of the first gate clock CPV1 and sequentially outputs the first gate signals GS1-GS2*n*−1 to the odd numbered gate lines G1-G2*n*−1. The first gate signals GS1-GS2*n*−1 may include first normal gate signals GS1 output during the first sub frame and first modulation gate signals GS2*n*−1 output during the second sub frame.

The first normal gate signals GS1 have the third pulse width W3 and the first modulation gate signals GS2*n*−1 have the fourth pulse width W4.

If the second vertical start signal STV2 is input into the second gate driver 320, the second gate driver 320 generates second gate signals GS2-GS2*n* having a high section during a high section of the second gate clock CPV2 and sequentially outputs the second gate signals GS2-GS2*n* to the even numbered gate lines G2-G2*n*. The second gate signals GS2-GS2*n* may include second normal gate signals GS2 output during the first sub frame and second modulation gate signals GS2*n* output during the second sub frame.

The second normal gate signals GS2 have the third pulse width W3 and the second modulation gate signals GS2*n* have the fourth pulse width W4.

According to a display panel and a method of driving the display panel in accordance with an exemplary embodiment of the inventive concept, a data voltage charge rate of a pixel is controlled by controlling pulse widths of gate signals according to an on/off operation of a backlight unit. Thus, waterfall noise occurring in the display panel is reduced and thereby an image displayed in all pixels may have the same or substantially the same brightness.

While the present inventive concept has been shown and described with reference to exemplary embodiments thereof, it will be apparent to those of ordinary skill in the art that various changes in form and detail may be made thereto without departing from the scope and spirit of the inventive concept as defined by the following claims.

What is claimed is:

1. A method of driving a display device, comprising:

outputting, from a timing controller, a gate control signal, an image signal, a backlight control signal and a data control signal, wherein the gate control signal includes a gate dock;

outputting, from a data driver, a data voltage, which corresponds to the image signal, to data lines of a display panel according to the data control signal;

outputting, from a gate driver, gate signals in synchronization with the gate clock to gate lines of the display panel;

performing an on-operation of a backlight unit during a high section of the backlight control signal; and performing an off-operation of the backlight unit during a low section of the backlight control signal, wherein the gate signals are output with a first pulse width during the high section of the backlight control signal and a second pulse width greater than the first pulse width during the low section of the backlight control signal.

2. The method of claim 1, wherein the gate clock is output with the first pulse width during the high section of the backlight control signal and the second pulse width during the low section of the backlight control signal.

3. The method of claim 1, wherein outputting the gate control signal, the image signal, the backlight control signal and the data control signal comprises:

generating a base clock and a gate enable signal; and generating the gate clock on the basis of the base clock and the gate enable signal.

4. The method of claim 3, wherein the gate clock has a low section according to a high section of the gate enable signal.

5. The method of claim 1, wherein outputting the gate signals in synchronization with the gate clock to the gate lines comprises:

applying a gate signal having the first pulse width to a first pixel of the display panel; and applying a gate signal having the second pulse width to a second pixel of the display panel, wherein a charge rate of a data voltage applied to the second pixel is greater than a charge rate of a data voltage applied to the first pixel.

6. The method of claim 5, wherein a brightness of an image displayed in the first pixel is the same as a brightness of an image displayed in the second pixel.

7. The method of claim 1, wherein a drive frequency of the backlight unit is greater than a drive frequency of the display panel.

8. A method of driving a display device, comprising:

outputting, from a timing controller, a first gate control signal, a second gate control signal, an image signal, a backlight control signal and a data control signal, wherein the first gate control signal includes a first gate clock and the second gate control signal includes a second gate clock;

outputting, from a data driver, a data voltage, which corresponds to the image signal, to data lines of a display panel according to the data control signal;

outputting, from a first gate driver, first gate signals in synchronization with the first gate clock to odd numbered gate lines of the display panel;

outputting, from a second gate driver, second gate signals in synchronization with the second gate clock to even numbered gate lines of the display panel;

performing an on-operation of a backlight unit during a high section of the backlight control signal; and performing an off-operation of the backlight unit during a low section of the backlight control signal, wherein the first gate signals and the second gate signals are output with a first pulse width during the high section of the backlight control signal and a second pulse width greater than the first pulse width during the low section of the backlight control signal.

9. The method of claim 8, wherein each of the first gate clock and the second gate clock have the first pulse width during the high section of the backlight control signal and the second pulse width during the low section of the backlight control signal.

10. The method of claim 8, wherein outputting the first gate signals in synchronization with the first gate clock to the odd numbered gate lines and outputting the second gate signals in synchronization with the second gate clock to the even numbered gate lines comprise:

applying a gate signal having the first pulse width to a first pixel of the display panel; and applying a gate signal having the second pulse width to a second pixel of the display panel, wherein a charge rate of a data voltage applied to the second pixel is greater than a charge rate of a data voltage applied to the first pixel.

11. The method of claim 10, wherein a brightness of an image displayed in the first pixel is the same as a brightness of an image displayed in the second pixel.

12. A display device, comprising:

a display panel including gate lines, data lines crossing the gate lines and a plurality of pixels, wherein the display panel is configured to display an image;

a timing controller configured to output a gate control signal, an image signal, a backlight control signal and a data signal, wherein the gate control signal includes a gate clock;

a data driver configured to output a data voltage, which corresponds to the image signal, to the data lines according to the data control signal;

a gate driver configured to sequentially output gate signals in synchronization with the gate clock to the gate lines; and a backlight unit configured to perform an on-operation during a high section of the backlight control signal and an off-operation unit during a low section of the backlight control signal, wherein the gate signals comprise:

first gate signals that are output during the high section of the backlight control signal and have a first pulse width; and second gate signals that are output during the low section of the backlight control signal and have a second pulse width.

13. The display device of claim 12, wherein the gate clock has the first pulse width during the high section of the backlight control signal and the second pulse width during the low section of the backlight control signal.

14. The display device of claim 12, wherein the timing controller comprises:

a signal generating part configured to generate a base clock and a gate enable signal; and a gate clock generating part configured to generate the gate clock on the basis of the base clock and the gate enable signal.

15. The display device of claim 14, wherein the gate clock has a low section according to a high section of the gate enable signal.

16. The display device of claim 12, wherein the plurality of pixels comprise:

a first pixel connected to a gate line to which the first gate signals are applied; and a second pixel connected to a gate line to which the second gate signals are applied, wherein a charge rate of a data voltage applied to the second pixel is greater than a charge rate of a data voltage applied to the first pixel.

17. The display device of claim 12, wherein a drive frequency of the backlight unit is greater than a drive frequency of the display panel.

18. A display device, comprising:

a display panel including gate lines, data lines crossing the gate lines and a plurality of pixels, wherein the display panel is configured to display an image;

a timing controller configured to output a first gate control signal, a second gate control signal, an image signal, a backlight control signal and a data signal, wherein the first gate control signal includes a first gate clock and the second gate control signal includes a second gate clock;

a data driver configured to output a data voltage, which corresponds to the image signal, to the data lines according to the data control signal;

a first gate driver configured to sequentially output first gate signals in synchronization with the first gate clock to odd numbered gate lines among the gate lines;

a second gate driver configured to sequentially output second gate signals in synchronization with the second gate dock to even numbered gate lines among the gate lines; and a backlight unit configured to perform an on-operation during a high section of the backlight control signal and an off-operation during a low section of the backlight control signal, wherein the first gate signals comprise;

third gate signals that are output during the high section of the backlight control signal and have a first pulse width; and fourth gate signals that are output during the low section of the backlight control signal and have a second pulse width, wherein the second gate signals comprise:

fifth gate signals that are output during the high section of the backlight control signal and have the first pulse width; and sixth gate signals that are output during the low section of the backlight control signal and have the second pulse width.

19. The display device of claim 18, wherein each of the first gate clock and the second gate dock has the first pulse width during the high section of the backlight control signal and the second pulse width during the low section of the backlight control signal.

20. The display device of claim 18, wherein the plurality of pixels comprise:

a first pixel connected to a gate line to which the third and fifth gate signals are applied; and a second pixel connected to a gate line to which the fourth and sixth gate signals are applied, wherein a charge rate of a data voltage applied to the second pixel is greater than a charge rate of a data voltage applied to the first pixel.

* * * * *